US008867779B2

(12) United States Patent  
Anbalagan et al.

(10) Patent No.: US 8,867,779 B2  
(45) Date of Patent: Oct. 21, 2014

(54) IMAGE TAGGING USER INTERFACE

(75) Inventors: Karthik G. Anbalagan, Bellevue, WA (US); Scott R. Ramsby, Kirkland, WA (US); Chunkit J. Chan, Redmond, WA (US); Michael H. Kim, Issaquah, WA (US); John M. Thornton, Kirkland, WA (US); Timothy R. O'Connor, Redmond, WA (US); Alexander S. Brodie, Redmond, WA (US); Samuel J. Pinson, Sultan, WA (US); Bryan P. Ferguson, Redmond, WA (US); Aanand Narayanan Pisharathu, Redmond, WA (US); Ryan A. Kabir, Bellevue, WA (US); Shanjeef Satchithanantham, Seattle, WA (US); Eric Richards, Redmond, WA (US); Eric W. Doerr, Kirkland, WA (US); William D. Sproule, Woodinville, WA (US); Shawn L. Morrissey, Redmond, WA (US); Mindy C. King, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1110 days.

(21) Appl. No.: 12/199,800

(22) Filed: Aug. 28, 2008

(65) Prior Publication Data

US 2010/0054601 A1    Mar. 4, 2010

(51) Int. Cl.  
*G06K 9/00* (2006.01)  
*G06F 17/30* (2006.01)

(52) U.S. Cl.  
CPC .............................. *G06F 17/30265* (2013.01)  
USPC ........................................................ 382/100

(58) Field of Classification Search  
CPC .................... G06F 17/241; G06K 2009/00328

USPC ................................................. 382/180, 100  
See application file for complete search history.

(56) References Cited

U.S. PATENT DOCUMENTS 5,548,705 A * 8/1996 Moran et al. ................... 715/863  
6,456,305 B1 9/2002 Qureshi et al.  
(Continued)

FOREIGN PATENT DOCUMENTS

| CN | 1641646 | 7/2005 |
| JP | 2008172745 | 7/2008 |

(Continued)

OTHER PUBLICATIONS

"Automatic Photo Tagging using Face Recognition", Retrieved at http://gallery.yahoo.com/apps/15750 >>, Dec. 21, 2007.*

(Continued)

*Primary Examiner* — Gandhi Thirugnanam  
(74) *Attorney, Agent, or Firm* — Bryan Webster; Andrew Sanders; Micky Minhas

(57) ABSTRACT

A global tag for an image is received identifies one or more objects in the image, and a region-specific tag for the image identifies one or more objects in a region of the image. The global tag and the region-specific tag are stored with the image. Displayed, along with the image, is an identifier for each of the one or more objects identified in the global tag, and an identifier for each of the one or more objects identified in the region-specific tag. Different users are able to maintain different names for the same person, allowing the same tag of the image to be used as the basis for displaying the image with different names for the different users. Additionally, the tags can be used as a basis for generating a credits list of people that are included in a compilation of images.

20 Claims, 11 Drawing Sheets

(56) References Cited

U.S. PATENT DOCUMENTS

| | | | |
|---|---|---|---|
| 6,804,684 B2* | 10/2004 | Stubler et al. ...................... 1/1 |
| 7,017,823 B2 | 3/2006 | Lapstun et al. |
| 7,032,182 B2 | 4/2006 | Prabhu |
| 7,068,309 B2 | 6/2006 | Toyama et al. |
| 7,133,571 B2 | 11/2006 | Cheatle |
| 7,574,069 B2 | 8/2009 | Setlur et al. |
| 7,636,450 B1* | 12/2009 | Bourdev ........................ 382/100 |
| 7,706,577 B1* | 4/2010 | Casillas et al. ................ 382/118 |
| 7,716,157 B1* | 5/2010 | Bourdev et al. ...................... 1/1 |
| 7,720,258 B1* | 5/2010 | Ullmann ........................ 382/103 |
| 7,788,247 B2* | 8/2010 | Wang et al. ................... 707/705 |
| 7,796,837 B2 | 9/2010 | Lueck |
| 7,809,722 B2* | 10/2010 | Gokturk et al. ............... 707/736 |
| 7,813,557 B1* | 10/2010 | Bourdev ........................ 382/205 |
| 7,945,653 B2* | 5/2011 | Zuckerberg et al. ......... 709/223 |
| 8,024,343 B2* | 9/2011 | Gallagher ..................... 707/737 |
| 8,064,727 B2 | 11/2011 | Lueck |
| 8,396,246 B2* | 3/2013 | Anbalagan et al. ........... 382/100 |
| 2001/0027488 A1* | 10/2001 | Hodgkin et al. .............. 709/229 |
| 2002/0054059 A1* | 5/2002 | Schneiderman ............... 345/700 |
| 2002/0055955 A1* | 5/2002 | Lloyd-Jones et al. ........ 707/512 |
| 2002/0103813 A1* | 8/2002 | Frigon ........................ 707/104.1 |
| 2002/0188602 A1* | 12/2002 | Stubler et al. .................... 707/3 |
| 2002/0191861 A1 | 12/2002 | Cheatle |
| 2003/0007078 A1 | 1/2003 | Feldis, III |
| 2003/0018668 A1 | 1/2003 | Britton et al. |
| 2003/0033296 A1* | 2/2003 | Rothmuller et al. .............. 707/3 |
| 2003/0088582 A1* | 5/2003 | Pflug ........................ 707/104.1 |
| 2003/0137522 A1 | 7/2003 | Kaasila et al. |
| 2004/0028294 A1* | 2/2004 | Fukuda ........................ 382/305 |
| 2004/0070678 A1 | 4/2004 | Toyama et al. |
| 2004/0126038 A1* | 7/2004 | Aublant et al. ............... 382/305 |
| 2004/0174434 A1 | 9/2004 | Walker et al. |
| 2004/0179684 A1 | 9/2004 | Appenzeller et al. |
| 2005/0005164 A1 | 1/2005 | Syiek et al. |
| 2005/0011959 A1 | 1/2005 | Grosvenor |
| 2005/0041858 A1 | 2/2005 | Celi, Jr. et al. |
| 2005/0246625 A1* | 11/2005 | Iyengar et al. ................ 715/512 |
| 2006/0004892 A1* | 1/2006 | Lunt et al. ..................... 707/204 |
| 2006/0204057 A1* | 9/2006 | Steinberg ...................... 382/118 |
| 2006/0218225 A1 | 9/2006 | Hee Voon |
| 2006/0241859 A1 | 10/2006 | Kimchi et al. |
| 2006/0242139 A1 | 10/2006 | Butterfield |
| 2006/0251338 A1* | 11/2006 | Gokturk et al. ............... 382/305 |
| 2006/0253491 A1 | 11/2006 | Gokturk |
| 2006/0274949 A1* | 12/2006 | Gallagher et al. ............ 382/228 |
| 2006/0274978 A1* | 12/2006 | Fukuda et al. ................ 382/305 |
| 2007/0008321 A1 | 1/2007 | Gallagher |
| 2007/0032244 A1 | 2/2007 | Counts |
| 2007/0073937 A1 | 3/2007 | Feinberg et al. |
| 2007/0098303 A1* | 5/2007 | Gallagher et al. ............ 382/305 |
| 2007/0124208 A1* | 5/2007 | Schachter et al. ............. 705/14 |
| 2007/0177805 A1* | 8/2007 | Gallagher ..................... 382/190 |
| 2007/0183634 A1 | 8/2007 | Dussich et al. |
| 2007/0195344 A1* | 8/2007 | Mochizuki et al. ........... 358/1.9 |
| 2007/0201761 A1 | 8/2007 | Lueck |
| 2007/0206844 A1 | 9/2007 | Russakoff et al. |
| 2007/0219964 A1 | 9/2007 | Cannon et al. |
| 2007/0226169 A1 | 9/2007 | Solyanik et al. |
| 2008/0040126 A1* | 2/2008 | Estrada et al. .................... 705/1 |
| 2008/0046458 A1 | 2/2008 | Tseng |
| 2008/0046813 A1 | 2/2008 | Doatmas et al. |
| 2008/0059478 A1* | 3/2008 | Craine ........................... 707/10 |
| 2008/0069480 A1* | 3/2008 | Aarabi et al. ................. 382/305 |
| 2008/0080743 A1 | 4/2008 | Schneiderman |
| 2008/0080745 A1* | 4/2008 | Vanhoucke et al. .......... 382/118 |
| 2008/0091723 A1* | 4/2008 | Zuckerberg et al. ....... 707/104.1 |
| 2008/0147645 A1* | 6/2008 | O'Malley ........................ 707/5 |
| 2008/0192129 A1 | 8/2008 | Walker et al. |
| 2008/0247600 A1* | 10/2008 | Date et al. ..................... 382/103 |
| 2008/0276177 A1* | 11/2008 | Sauve ........................... 715/733 |
| 2008/0278438 A1* | 11/2008 | Brown et al. ................. 345/156 |
| 2008/0282177 A1* | 11/2008 | Brown et al. ................. 715/763 |
| 2009/0006415 A1 | 1/2009 | McAniff et al. |
| 2009/0040315 A1 | 2/2009 | Nakase et al. |
| 2009/0125570 A1 | 5/2009 | Bailey et al. |
| 2009/0208062 A1 | 8/2009 | Sorek et al. |
| 2009/0208118 A1 | 8/2009 | Csurka |
| 2009/0324022 A1 | 12/2009 | Sangberg et al. |
| 2009/0324137 A1* | 12/2009 | Stallings et al. .............. 382/306 |
| 2010/0054600 A1* | 3/2010 | Anbalagan et al. ........... 382/180 |
| 2010/0054601 A1* | 3/2010 | Anbalagan et al. ........... 382/180 |
| 2010/0063961 A1* | 3/2010 | Guiheneuf et al. ........... 707/622 |
| 2010/0287197 A1* | 11/2010 | Wang et al. ................... 707/769 |
| 2010/0318510 A1* | 12/2010 | Ryu ............................... 707/722 |
| 2011/0202531 A1* | 8/2011 | Zuckerberg et al. .......... 707/737 |
| 2011/0225481 A1* | 9/2011 | Zuckerberg et al. .......... 715/205 |
| 2011/0231747 A1 | 9/2011 | Zuckerberg et al. |
| 2011/0292231 A1* | 12/2011 | Winters ..................... 348/222.1 |
| 2012/0124508 A1 | 5/2012 | Morin et al. |
| 2013/0195375 A1 | 8/2013 | Anbalagan et al. |

FOREIGN PATENT DOCUMENTS

| | | |
|---|---|---|
| KR | 20060055901 | 5/2006 |
| KR | 20070112625 | 11/2007 |

OTHER PUBLICATIONS

"Undo", May 13, 2006, "http://web.archive.org/web/20060513202858/http://en.wikipedia.org/wiki/Undo".*

"How to Un Tag Photos on Facebook?", http://answers.yahoo.com/question/index?qid=20080506190052AAMqMNy , May 6, 2008.*

"Flickr: Open Up Tagging Your Photos to the Community, Please", "http://www.climbtothestars.org/archives/2007/06/20/flickr-open-up-tagging-your-photos-to-the-community-please/", Jun. 20, 2006.*

Golbeck, J. et al. "An Experimental Study of Social Tagging Behavior and Image Content", May 27, 2011, Journal of the American Society for Information Science and Technology, p. 1750-1760.*

Sang-Kyun, Kim et al., "User-Friendly Personal Photo Browsing for Mobile Devices", Retrieved from http://etrij.etri.re.kr/Cyber/servlet/GetFile?fileid=SPF-1212988137996, ETRI Journal, vol. 30, No. 3,(Jun. 2008),9.

Ting-Hsiang, Huang et al., "Beyond Memories: Weaving Photos into Personal Social Networks", Reteived from http://www.isi.edu/~pynadath/MOO-2006/huang.pdf, 8.

Viola, Paul et al., "Robust Real-Time Object Detection", *Second International Workshop on Statistacal and Computational Theories of Vision—Modeling, Learning, Computing, and Sampling*, Vancouver, Canada Jul. 13, 2001,(Jul. 13, 2005),1-25.

"PCT Search Report and Written Opinion", Application No. PCT/US2009/051640, (Feb. 1, 2010), 11 pages.

"PCT Search Report and Written Opinion", Application No. PCT/US2009/051630, (Feb. 26, 2010), 11 pages.

"Farrell, et al.", "Fringe Contacts: People-Tagging for the Enterprise", retrieved at<< http://www.semanticmetadata.net/hosted/taggingws-www2006-files/25.pdf >>, IBM Almaden Research Centre, California, pp. 5.

"Maala, et al.", "A Conversion Process from Flickr Tags to RDF Descriptions", retrieved at << http://ftp.informatik.rwth-aachen.de/Publications/CEUR-WS/Vol-245/paper5.pdf >>, pp. 11.

"Automatic Photo Tagging using Face Recognition", Retrieved at<< http://gallery.yahoo.com/apps/15750 >>, Jul. 15, 2008, p. 1.

"Casas, et al.", "Region-Based Image and Video Representation", retrieved at<< http://enterface.tel.fer.hr/docs/presentations/Image%20and%20Video%20Representation.pdf >>, pp. 22.

"Mezaris, et al.", "An Extensible Modular Common Reference System for Content-Based Information Retrieval: The Schema Reference System", retrieved at<< http://www.ist-chorus.org/telecharge-ment/1195808062.pdf >>, pp. 8.

"Foreign Office Action", Chinese Application No. 200980134109.1, (Mar. 30, 2012),7 pages.

"Non-Final Office Action", U.S. Appl. No. 12/199,799, (Feb. 2, 2012), 10 pages.

"Restriction Requirement", U.S. Appl. No. 12/199,799, (Dec. 8, 2011),6 pages.

"Foreign Office Action", Chinese Application No. 200980134107.2, (Dec. 5, 2012), 8 pages.

(56) References Cited

OTHER PUBLICATIONS

"Foreign Office Action", Chinese Application No. 200980134109.1, (Jan. 30, 2013), 7 pages.

"Notice of Allowance", U.S. Appl. No. 12/199,799, (Oct. 10, 2012), 10 pages.

"Foreign Office Action", Chinese Application No. 200980134107.2, (Apr. 26, 2013), 13 pages.

"Foreign Office Action", Chinese Application No. 200980134109.1, (Jul. 17, 2013), 10 pages.

"Non-Final Office Action", U.S. Appl. No. 13/794,443, (Jun. 21, 2013), 25 pages.

Urban, John "Simple Scalable Image", Retrieved from <http://home.comcast.net/~urbanjost/IMG/resizeimg.html> on Jun. 17, 2013, (Feb. 23, 2008), 1 page.

"Foreign Office Action", CN Application No. 200980134107.2, Oct. 22, 0213, 12 pages.

"Final Office Action", U.S. Appl. No. 13/794,443, Dec. 13, 2013, 34 pages.

"Foreign Office Action", CN Application No. 200980134109.1, Feb. 25, 2014, 11 pages.

"Non-Final Office Action", U.S. Appl. No. 13/794,443, Jul. 2, 2014, 19 pages.

"Foreign Office Action", CN Application No. 200980134107.2, May 4, 2014, 14 Pages.

\* cited by examiner

John

Jane Doe

IMAGE TAGGING USER INTERFACE

BACKGROUND

As computing and digital imaging technology has advanced, computers have become an increasingly popular platform for managing, viewing, and sharing photographs, video, and other images. Despite this popularity, problems with current systems remain. These problems include, for example, cumbersome processes for identifying regions of photographs showing people, cumbersome processes for labeling regions with names of people in those regions, different names being used to label the same person, and so forth. These problems detract from the usability of such systems, and degrade the user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the image tagging user interface, a global tag for an image is received, the global tag identifying one or more objects in the image. A region-specific tag for the image is also received, the region-specific tag identifying one or more objects in a region of the image. The global tag and the region-specific tag are stored with the image. Displayed, along with the image, is an identifier for each of the one or more objects identified in the global tag, and an identifier for each of the one or more objects identified in the region-specific tag.

In accordance with one or more aspects of the image tagging user interface, an image having a region tagged by a first user is obtained, the tag including a first label of a person in the region, the first label being used by the first user to identify the person in the region. A second label of the person is determined, the second label being used by a second user to identify the person in the region, and the image is displayed with the second label when displaying the image for the second user.

In accordance with one or more aspects of the image tagging user interface, one or more tags associated with an image compilation are identified. For each identified tag, a person identified in the tag is identified. A list of people in the image compilation is generated, the list including each identified person.

BRIEF DESCRIPTION OF THE DRAWINGS

The same numbers are used throughout the drawings to reference like features.

DETAILED DESCRIPTION

An image tagging user interface is described herein. Images are displayed to users, allowing the users to add to the images global tags that are associated with the entire image as well as region-specific tags that are associated with specific regions of the image. These tags typically include a name of a person identified in the image and/or region. Different users are able to maintain different names for the same person, allowing the same tag of the image to be used as the basis for displaying the image with the different names for the different users. Additionally, the tags can be used as a basis for generating a credits list of people that are included in a compilation of images.

Figure 1:
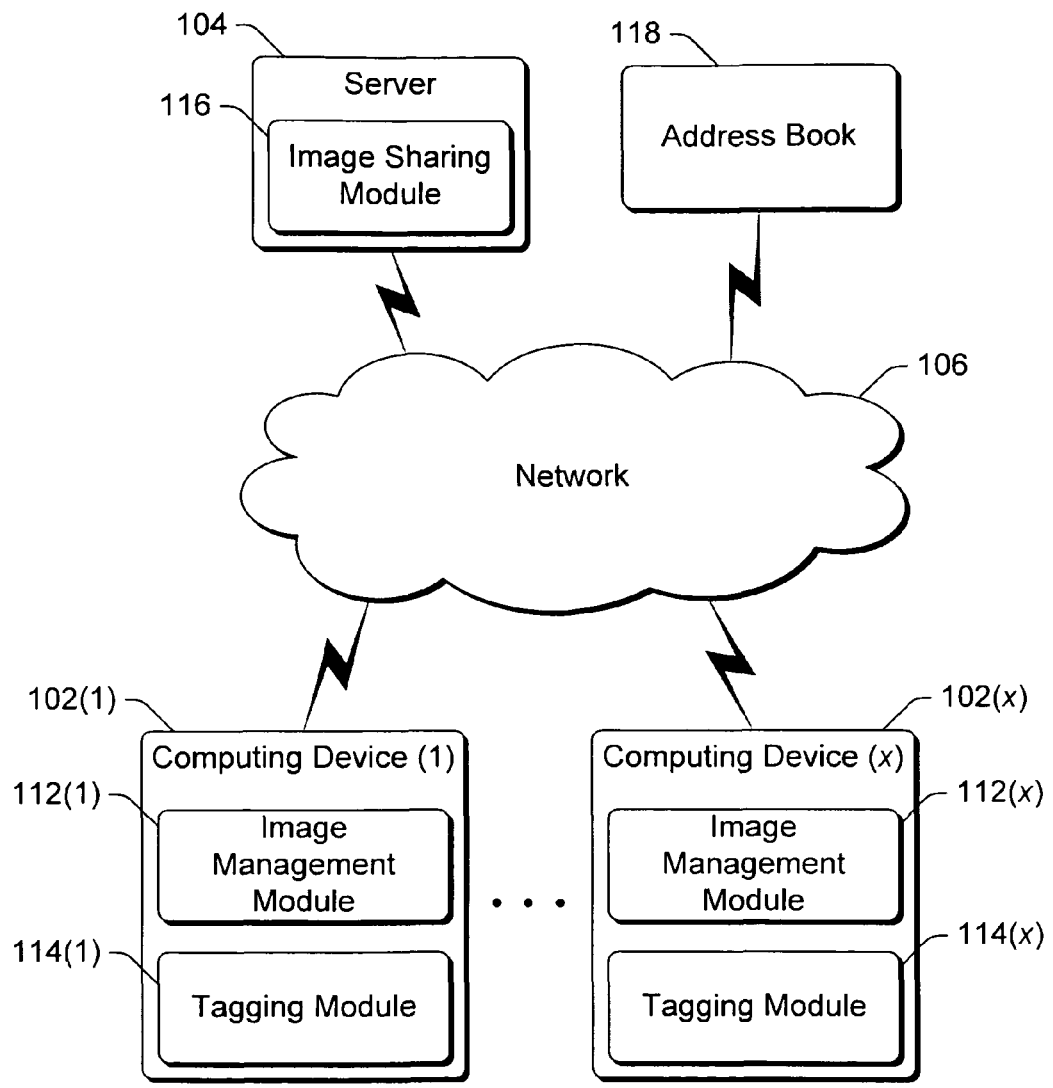
FIG. 1 illustrates an example system implementing the image tagging user interface in accordance with one or more embodiments.

FIG. 1 illustrates an example system 100 implementing the image tagging user interface in accordance with one or more embodiments. System 100 includes one or more (x) computing devices 102 that can communicate with a server 104 via a network 106. Network 106 can be a variety of different networks, including the Internet, a local area network (LAN), a public telephone network, a cellular or other wireless phone network, an intranet, other public and/or proprietary networks, combinations thereof, and so forth.

Each computing device 102 can be a variety of different types of devices. For example, a computing device 102 can be a desktop computer, a mobile station, an entertainment appliance, a set-top box communicatively coupled to a display device, a cellular or other wireless phone, a personal digital assistant (PDA), a game console, an automotive computer, and so forth. Thus, each computing device 102 can range from a full resource device with substantial memory and processor resources (e.g., personal computers, game consoles) to a low-resource device with limited memory and/or processing resources (e.g., traditional set-top boxes, handheld game consoles). Different computing devices 102 can be the same type or alternatively different types of devices.

Server 104 can also be a variety of different types of computing devices. Similar to the discussion of computing device 102, server 104 can range from a full resource device with substantial memory and processor resources to a low-resource device with limited memory and/or processing resources. Although only one server 104 is illustrated system 100, alternatively multiple servers 104 can be included in system 100.

Each computing device 102 includes an image management module 112 and a tagging module 114. Image management module 112 manages images on computing device 102, including the storage, retrieval, display, communication, and so forth of images. Images can be stored by computing device 102 locally, or alternatively on a remote storage device. Tagging module 114 assists users in tagging images, allowing names or labels to be associated with particular images and/or regions of images as discussed in more detail below.

Server 104 includes an image sharing module 116. Image sharing module 116 manages the storing and sharing of images by server 104. Users of various computing devices 102 can access and view images managed by module 116, as discussed in more detail below.

In one or more embodiments, image sharing module 116 supports social networking, allowing multiple users to communicate with one another and share their images with one another. An address book 118, also referred to as an online address book, can be used by server 104 and/or computing devices 102 to allow users to maintain a list of contacts. Address book 118 can be maintained by a server (e.g., a server 104 or other server), or alternatively can be maintained by computing devices 102. These contacts refer to other users with which the user desires to share his or her images. Various aspects of the image tagging user interface discussed herein can be used to facilitate this image sharing. Additionally, it should be noted that various aspects of the image tagging user interface can be used to facilitate image management on computing devices 102 without sharing images with other users.

The image tagging user interface discussed herein supports tagging of images. Tagging images refers to associating a particular label with an image or a portion (referred to as a region) of an image. These labels are discussed herein primarily as names of people in images. Accordingly, this tagging can also be referred to as tagging images with people or people names. Alternatively, labels for other objects can be supported (e.g., my house, the Statue of Liberty, Pacific Ocean, and so forth) analogous to the names discussed herein. As discussed in more detail below, in addition to the label this tagging can also associate one or more additional identifiers of a person (or object) with an image or portion of an image.

Tags can be global tags or region-specific tags. A global tag is associated with an entire image. For example, a global tag with the name "Bob" can be associated with an image, indicating that a person named "Bob" is included in the image. A region-specific tag, also referred to as a region tag, is associated with a portion or region of an image. For example, a region tag with the name "John" can be associated with a particular region of the image, indicating that a person named "John" is included in that region of the image.

Images are typically tagged by a user of a computing device 102 via tagging module 114. The image can then be viewed by a user of computing device 102. Additionally, the image can then be communicated to server 104 and image sharing module 116 allows other users to view the image (and associated tags). This allowing of other users to view the image is also referred to as publishing the image. In one or more embodiments, various constraints on who can view the image are imposed by image sharing module 116. Typically, only those users that are contacts of the user that had the image uploaded to server 104 (also referred to as the sharing user) are allowed to view the image and associated tags, although alternatively other constraints can be imposed.

Once published by image sharing module 116, other users can also tag the image via the tagging module 114 on the computing devices 102 they are using. These additional tags are added to the image so that they can be viewed by other users, including the user that had the image published.

Images can also be downloaded to computing devices 102 from server 104. In such situations, the tags for those images are also downloaded. In one or more embodiments, tags added to an image after it has been downloaded to a computing device 102 are not made available to other users unless the downloaded image is re-published. In other embodiments, tags added to an image after it has been downloaded are communicated to server 104, allowing other users to view the tags even though the image was tagged locally at a computing device 102.

Tagging module 114 presents a user interface to a user of computing device 102 allowing both global and region-specific tagging. The tag includes a label or name of a person included in the image, and can also include one or more additional identifiers of the person. In one or more embodiments, image sharing module 116 is part of an online service that users join. As part of this service, users are assigned an identifier (ID) that typically uniquely identifies the user within that service. This ID can be stored as part of the tag. Additionally, in one or more embodiments an email address of the user (or other value based on the email address, such as a hash value generated by applying a hash function to the email address) is stored as part of the tag. These one or more additional identifiers can be used to distinguish between different users that are named in the tags, as discussed in more detail below. These IDs and email addresses can be stored by address book 118, or alternatively by other services, components, and/or modules.

The ID and/or email address (or hash thereof) is typically added to the tag when the tag is created. This information can be obtained in a variety of different manners, such as by accessing address book 118, being manually input by the user, and so forth. In one or more embodiments, and as discussed in more detail below, a list of possible people to tag an image with can be displayed to the user. This list can be obtained from, for example, address book 118. The people included in this list are referred to as contacts of the user, and an ID and/or email address has typically already been input by the user (or another), and can be copied form this contact information to the tag.

Additionally, in one or more embodiments an image can be tagged with a global or region-specific tag for a person with a name, but no other ID or email address. If such an ID or email address were to later become available, then such ID or email address can be added to the tag. For example, the user could initially tag an image with the name "Mom" without any ID or email address. The user can subsequently add an ID and/or email address, and request that tags having the name "Mom" be updated to incorporate this new ID and/or email address. The tags of the various images of the user can be searched to identify any having the label "Mom", and the ID and/or email address (or hash thereof) can be added to the tags found from this search.

Although discussed herein primarily as tagging individual images, it is to be appreciated that the techniques discussed herein can also be used with collections or sequences of images. By way of example, a video or other sequence of images can be tagged using the techniques discussed herein. In one or more embodiments tags on video or other sequences of images are global tags, although alternatively region-specific tags could be used with video or other sequences of images.

Figure 2:
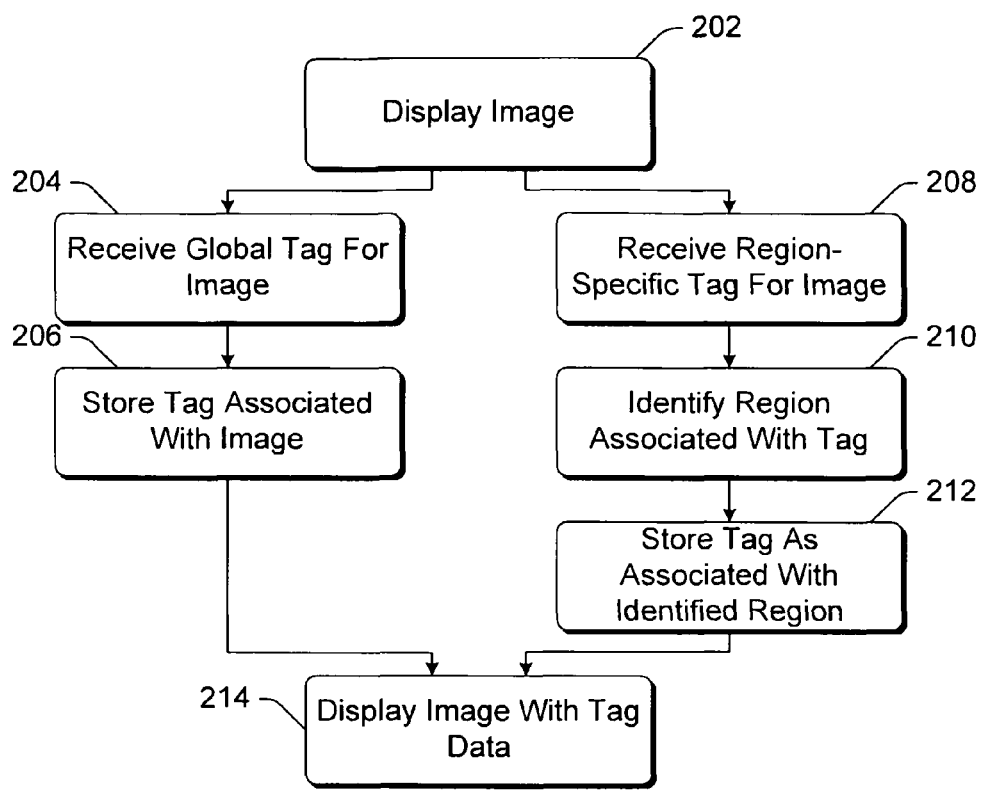
FIG. 2 is a flowchart illustrating an example process for tagging an image in accordance with one or more embodiments.

FIG. 2 is a flowchart illustrating an example process 200 for tagging an image in accordance with one or more embodiments. Process 200 is carried out by a device, such as a computing device 102 of FIG. 1, and can be implemented in software, firmware, hardware, or combinations thereof. Process 200 can be carried out by, for example, a tagging module 114 of FIG. 1. Process 200 is an example process for tagging an image; additional discussions of tagging images are included herein with reference to different figures.

In process 200, an image is displayed (act 202). The full image can be displayed in act 202, or alternatively a thumbnail or other identifier of the image can be displayed in act 202.

A global tag for the image is received (act 204) and stored with the image (act 206). Acts 204 and 206 can optionally be repeated, allowing multiple global tags to be stored with the image.

In addition, or alternatively, a region-specific tag for the image is received (act 208) and a region of the image to be associated with the tag is identified (act 210). The region-specific tag is also stored with the image (act 212). As part of the region-specific tag, an identification of the region is included as part of the tag. Acts 208, 210, and 212 can optionally be repeated, allowing multiple region-specific tags to be stored with the image.

The image can also be displayed with the data from one or more tags (act 214). This data can be the name stored in the tag or alternatively other data (e.g., other parts of the tag, data obtained based on the tag (e.g., a telephone number or different name for a person identified in the tag obtained from address book 118 of FIG. 1, etc.), and so forth). The tag data displayed with the image can be displayed in a variety of different manners, such as overlaying the image, in a border around the image, as a pop-up when a cursor is moved over the image or a specific region of the image, and so forth.

Global tags for an image can be received in act 204 in a variety of different manners. In one or more embodiments, whether a received tag is a global tag or a region-specific tag is identified automatically by the device implementing process 200. If a particular region of the image has been selected, then process 200 assumes that the tag is a region-specific tag associated with the selected region. However, if no region of the image has been selected, then process 200 assumes that the tag is a global tag for the image.

Alternatively, global tags (and/or region-specific tags) can be received in different manners. For example, an "add global tag" option can be selected from a menu, icon, voice command, and so forth and the tag data entered by the user. The user can then select one or more images to which the tag is to be added, or alternatively any image or identifier thereof displayed when the "add global tag" option is selected can automatically have the global tag added to it.

A region for a region-specific tag can be identified in act 210 in a variety of different manners. In one or more embodiments, the user can select a particular region such as by using a cursor to draw a rectangle or other shape around the desired region, dragging and dropping a rectangle or other shape on the desired region, and so forth.

Alternatively, a region can be automatically identified for the user. For example, one or more of a variety of different conventional face detection algorithms or processes can be used to identify regions in the image that include a face. One such algorithm is the object detection described in "Robust Real-time Object Detection" by Paul Viola and Michael Jones, $2^{nd}$ International Workshop on Statistical and Computational Theories of Vision—Modeling, Learning, Computing, and Sampling, Jul. 13, 2001. However, it is to be appreciated that this is only an example face detection algorithm, and other algorithms can alternatively be used.

Each of these automatically identified regions can be a region identified in act 210. By way of example, a user can select a particular name from a list or otherwise input a particular name, then select one of the regions including a face of the person having that particular name. The tag including that particular name and that selected region is stored as part of the image.

This automatic detection of regions can be used in a variety of different manners. In one or more embodiments, when an image is displayed to a user, regions for which no tag has been associated yet are identified to the user. This identification can take a variety of different forms, such as outlining the region with a particular line color, graying out or shadowing other portions of the image, and so forth. The user is then able to readily see regions in his or her images for which no tag has yet been associated, and quickly and easily tag those regions.

Additionally, in one or more embodiments regardless of the manner in which regions are identified, the regions can be moved and/or resized. This resizing can be done in a variety of different manners, such as by using a cursor and cursor control device to drag a particular one or more edges, to drag a particular corner, to move the entire rectangle or other shape defining the region, and so forth.

Furthermore, global tags can be converted to region-specific tags, and region-specific tags can be converted to global tags. A global tag can be converted to a region-specific tag by a user identifying a particular region to associate with the global tag. For example, a user can select or define a region in the image and then select an identifier of the global tag (e.g., the data being displayed as global tag), in response to which the global tag becomes a region-specific tag associated with the user selected or defined. A region-specific tag can be converted to a global tag by a user selecting a "make global" option such as from a menu, toolbar, verbal input, and so forth. In response to selection of this option, the association of the tag with a specific region is removed, resulting in the tag being a global tag.

Figure 3A:
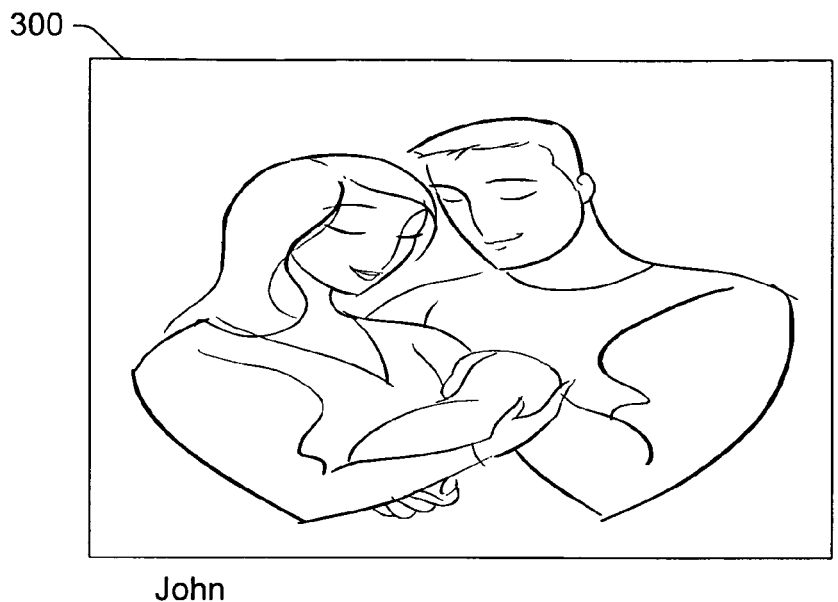
FIGS. 3A and 3B illustrate examples of global and region-specific tags in accordance with one or more embodiments.
Figure 3B:
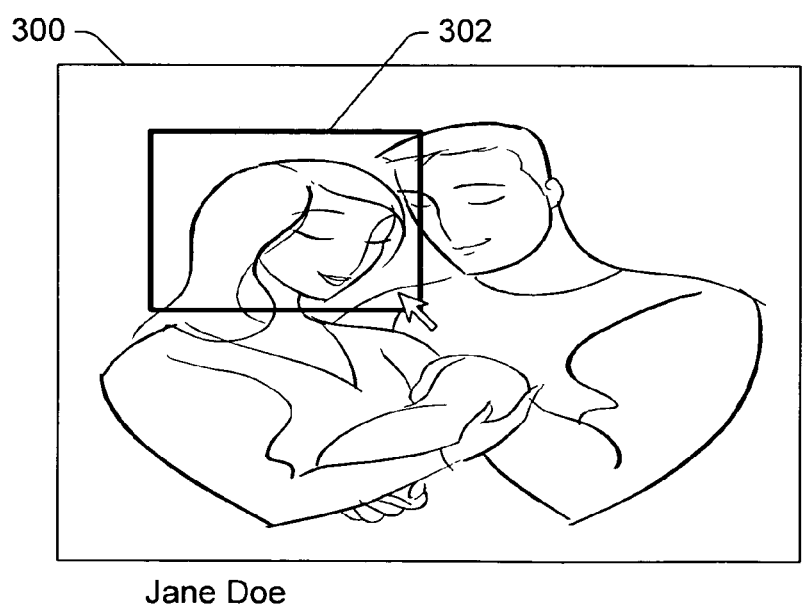

FIGS. 3A and 3B illustrate examples of global and region-specific tags in accordance with one or more embodiments. It is to be appreciated that the display of a region and/or tag data in FIGS. 3A and 3B are only examples, and that these can alternatively be displayed in other manners.

In FIG. 3A, an image 300 includes a global tag of "John" indicating that a person by the name of John is included in the image. In FIG. 3B, the image 300 is shown including a region-specific tag of "Jane Doe" indicating a person by the name of Jane Doe is included in the illustrated region. The region illustrated in FIG. 3B is shown outlined by a rectangle 302. This rectangle 302 can be displayed in response to a variety of different actions, such as a user request to display regions of the image, a user positioning a cursor over the region, and so forth.

Figure 4:
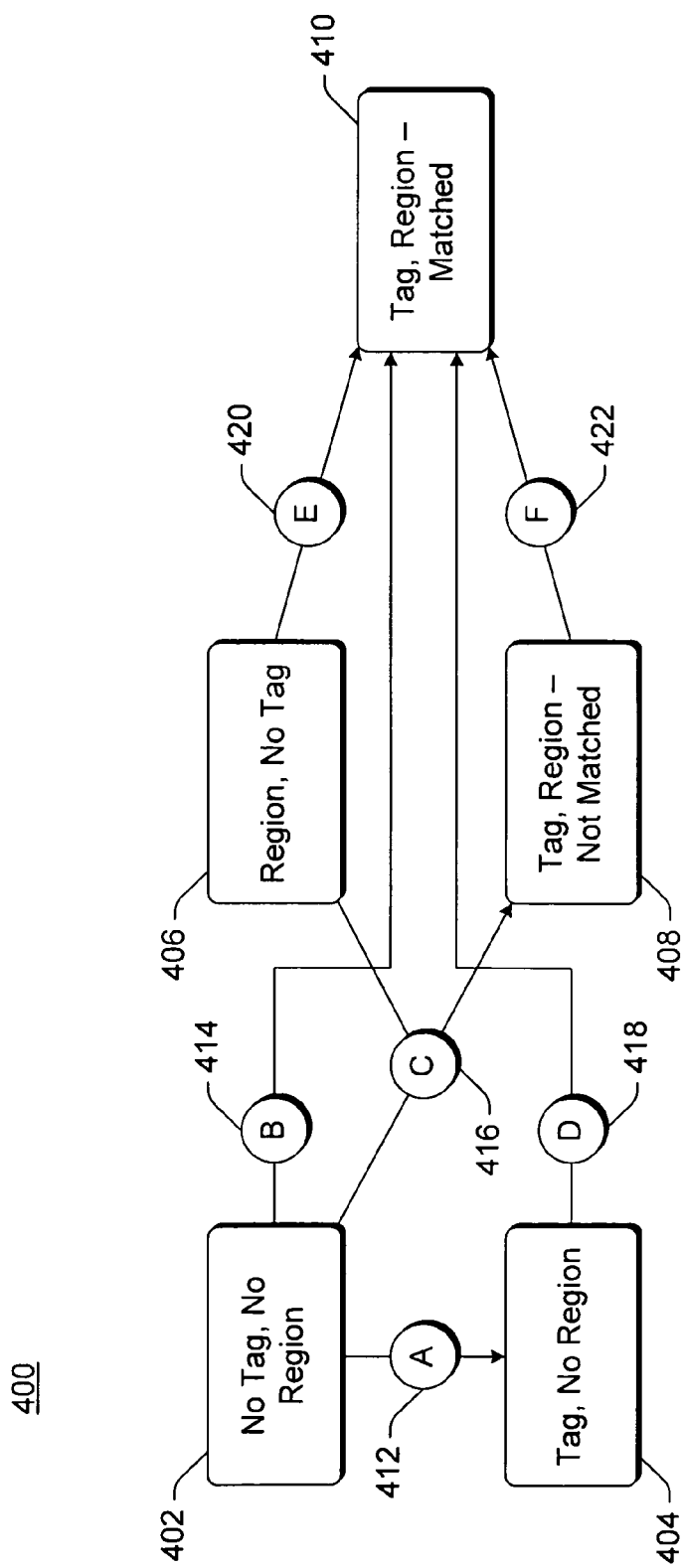
FIG. 4 illustrates an example state diagram for tagging states of images in accordance with one or more embodiments.

FIG. 4 illustrates an example state diagram 400 for tagging states of images in accordance with one or more embodiments. State diagram 400 illustrates states 402, 404, 406, 408, and 410, which are five different people tagging states. In state 402, no tag has been associated with the image, and no region has been identified in the image. In state 404, a tag has been associated with the image but no region has been identified in the image. In state 404, the tag is a global tag. In state 406, a region has been identified in the image but no tag has been associated with the image. In state 408, a tag has been assigned to the image and a region has been identified in the image, but the tag and region are not matched to or associated with one another. In state 408, the tag is a global tag. In state 410, a tag has been assigned to the image and a region associated with that tag has been identified (the image and region are matched). In state 410, the tag is a region-specific tag.

In state 402, a user can assign a global tag to the image, resulting in a transition 412 to state 404. Alternatively, in state 402 a user can assign a region-specific tag to the image, resulting in a transition 414 to state 410. In state 402, a user could also assign a global tag to the image, and a face could automatically be detected as a region in the image, resulting in a transition 416 to state 408.

In state 404, a user can locate a person in the image corresponding to the global tag and associate a region including that person with the tag, resulting in a transition 418 to state 410.

In state 406, a user can identify a detected region (e.g., automatically detected as including a face) and match it with a tag, resulting in a transition 420 to state 410. Alternatively, in state 406 a user could assigned a global tag to the image, resulting in a transition 416 to state 408.

In state 408, a user can match the tag and the region, resulting in a transition 422 to state 410.

Additionally, the image tagging user interface discussed herein can facilitate identification of a name for a global or region-specific tag. In one or more embodiments, a particular icon, menu option, verbal input, and so forth is used to identify the particular user. For example, an icon with the user's name or some other identifier (e.g., "That's Me") can be displayed to the user allowing the user to quickly and easily identify themselves as the name of the person to be included in a global or region-specific tag.

Furthermore, in one or more embodiments a list of commonly or frequently used names is displayed or otherwise presented to the user. The user can select a name from this list as the name of the person to be included in a global or regional-specific tag. This allows the user to quickly and easily identify commonly or frequently used names of people to be included in global or region-specific tags.

Figure 5:
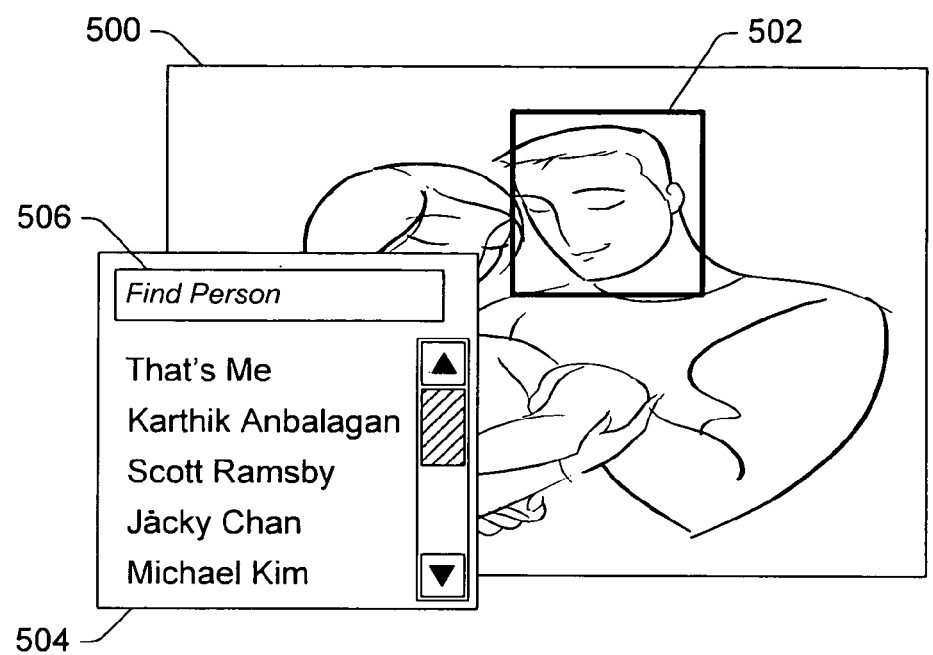
FIG. 5 illustrates an example list facilitating identification of a name for a global or region-specific tag.

FIG. 5 illustrates an example list facilitating identification of a name for a global or region-specific tag. In the example of FIG. 5, an image 500 is displayed and a region 502 in image 500 is identified. A list 504 is also displayed including an option of "That's Me", as well as four other commonly or frequently used names: Karthik Anbalagan, Scott Ramsby, Jacky Chan, and Michael Kim in this example. List 504 also includes a scrollbar to allow the user to scroll through and display additional names in list 504. A tooltip can also be displayed to the user (e.g., whenever a pointer is moved over a particular name in list 504), displaying the email address of the named person (e.g., as obtained from address book 118 of FIG. 1). Additionally, if the situation arises where two names in list 504 are the same (e.g., two names of "John"), additional information to differentiate between the two can also be displayed, such as the email addresses of the name people (e.g., as obtained from address book 118).

An additional search box 506 is also displayed allowing a user to enter letters or other characters in order to search for a particular person that is not currently displayed in list 504. In one or more embodiments the search is a prefix matching search searching multiple parts of a person's name or identity (e.g., first name, last name, middle name, nickname, alias, and so forth). It is to be appreciated that any of a variety of other search techniques or algorithms can alternatively be used.

List 504 allows the user to easily and quickly identify the person included in region 502. For example, the user could use a cursor and cursor control device to click on region 502 then click on "That's Me" to identify the person included in region 502 as the user and have the user's name included in the tag associated with region 502. Additional information, such as the user's ID and hash of an email address from address book 118 of FIG. 1 can also included in the tag. By way of another example, the user could click on region 502 then click on "Scott Ramsby" to identify the person included in region 502 as Scott Ramsby and have the name "Scott Ramsby" included in the tag associated with region 502. Additional information, such as the ID and hash of an email address of Scott Ramsby from address book 118 of FIG. 1 can also included in the tag.

The names displayed in list 504 are names from a contact list corresponding to the user. This contact list could be stored, for example, in address book 118 of FIG. 1. A tagging module, such as tagging module 114 of FIG. 1 maintains a record of a frequency and/or how recently each name in the contact list has been used by the user in a global and/or region-specific tag. This record can be used in a variety of different manners to identify an ordering of the names in list 504. For example, people that are more frequently selected as being included in images can be displayed in list 504 before (e.g., higher than) people that are less frequently selected as being included in the images. By way of another example, people that have been identified more recently as being included in images are displayed before (e.g., higher than) people that are identified less recently as being included in the images.

Different factors can also be used in determining the names, and/or the ordering of names, in list 504. For example, a person identified in a global tag for the image but no region-specific tag for the image can be included before (e.g., higher than) other people in list 504. By way of a further example, if a person has already been included in a region-specific tag for the image, that person's name is not shown in list 504. By way of another example, the user's name (or "That's Me") can be included before (e.g., higher than) other people in list 504. By way of yet another example, a person already included in a region-specific tag for the image can be included after (e.g., lower than) other people in list 504. Furthermore, it is to be appreciated that different combinations of these factors as well as the frequency and/or how recently each name in the contact list has been used by the user can be used in identifying the names included in and/or the ordering of names in list 504.

In one or more embodiments, this record is used as follows to identify the ordering of names in list 504. It is to be appreciated that the following is only an example of identifying the ordering of names in list 504, and that other techniques can alternatively be used. The contact list is first ordered by frequency of use from the most frequently used to the least frequently used. The five contacts identified in the most recently added tags are put in an MRU list, sorted by frequency from the most frequently used to the least frequently used. List 504 is then populated with names as follows:

1) If the image is tagged with a global tag identifying the user but no region-specific tag identifying the user, then the user is added to the top of list 504 (as a "That's Me" entry).
2) If the image is tagged with any other global tags identifying other contacts in the contact list, then those contacts are added to the top of list 504 (after the user's name, if added in 1)).
3) After 1) and 2), if fewer than five slots in list 504 have been filled, then the most recently used contacts from the MRU list are added next to list 504 until all five slots have been filled.
4) Any remaining contacts in the MRU list and/or contact list are added to list 504 in alphabetical order.

Figure 6:
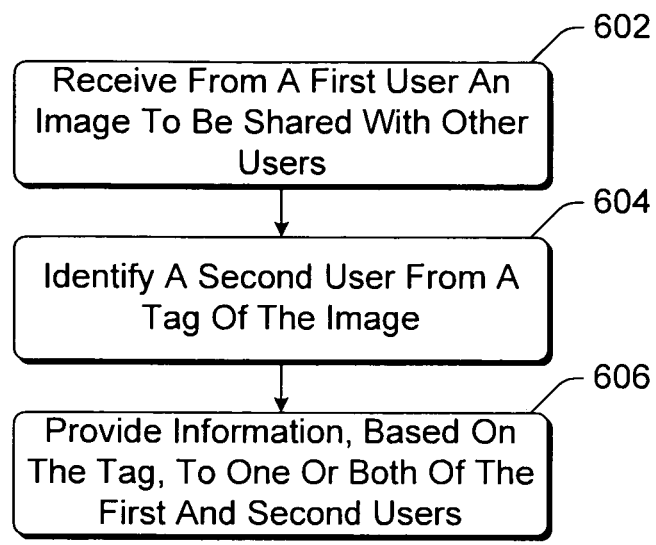
FIG. 6 is a flowchart illustrating an example process for providing information regarding a published image in accordance with one or more embodiments.

Returning to FIG. 1, when an image is published by image sharing module 116, various additional information can be provided to the user requesting that the image be published, as well as to other users. FIG. 6 is a flowchart illustrating an example process 600 for providing information regarding a published image in accordance with one or more embodiments. Process 600 is carried out by a device, such as a server 104 of FIG. 1, and can be implemented in software, firmware, hardware, or combinations thereof. Process 600 can be carried out by, for example, an image sharing module 116 of FIG. 1. Process 600 is an example process for providing information regarding a published image; additional discussions of providing information regarding a published image are included herein with reference to different figures.

In process 600, an image to be shared with other users is received from a first user (act 602). This image is typically received from the first user via an image management module of a computing device (e.g., a device 102 of FIG. 1) being used by the first user. This image to be shared is an image that is published by the first user.

A second user is identified from a tag that is included in the received image (act 604). This tag can be a global tag or a region-specific tag. As discussed above, a tag can include an ID and/or email address (or hash thereof) of a person identified in the tag. This ID and/or email address is retrieved in act 604.

Information is then provided, based on the tag, to one or both of the first user and the second user (act 606). This information that is provided can take a variety of different forms. Additionally, if the received image includes multiple tags, then acts 604 and 606 can be repeated for each of these multiple tags, resulting in multiple information being provided when the image is published.

In one or more embodiments, the information provided in act 606 is a notification to the second user that an image including the second user has been published. This information can optionally include an identification of the first user (the user that requested publication of the image). This notification can take a variety of forms, such as an email notification, an instant message notification, an alert displayed in a dialog box or otherwise presented to the second user, so forth.

Additionally, in one or more embodiments the information provided in act 606 is a notification to the first user of other images that have been published by the second user. This notification can take a variety of forms, such as an email notification, an instant message notification, an alert displayed in a dialog box or otherwise presented to the second user, so forth. This notification allows the first user to access and view other images that have been shared by the second user.

Additionally, different users can name or otherwise identify the same person in different manners. For example, one user may call a particular person "Mom", while another user may call that particular person "Sis", and yet another user may call that particular person "Barb". Even though different tags created by these different users include different names for that particular person, the same identifier and/or email address would be included in those different tags. This allows, for example, a tag created for an image by a first user that calls the person "Mom" to be used to display a label of "Sis" to a second user when displaying that image. This displaying of different names or labels for the same person for different users is also referred to as merging tags or linking tags.

Figure 7:
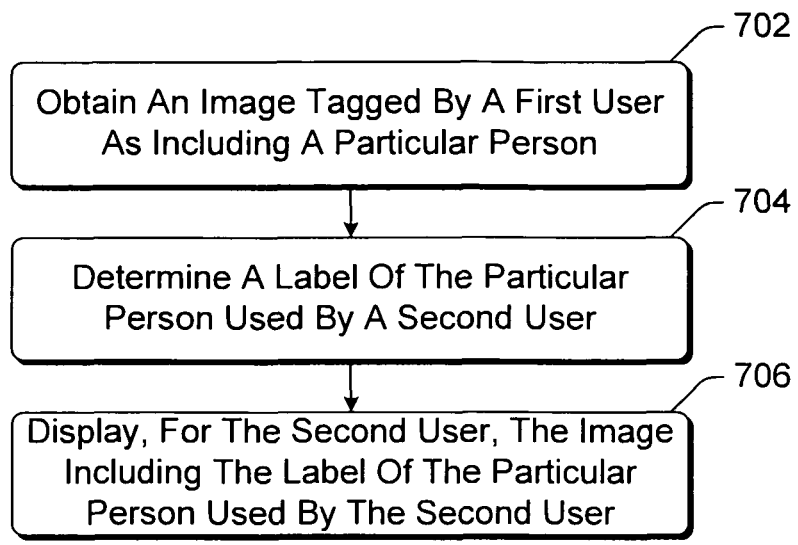
FIG. 7 is a flowchart illustrating an example process for merging tags in accordance with one or more embodiments.

FIG. 7 is a flowchart illustrating an example process 700 for merging tags in accordance with one or more embodiments. Process 700 is carried out by a device, such as a server 104 of FIG. 1 or a computing device 102 of FIG. 1, and can be implemented in software, firmware, hardware, or combinations thereof. Process 700 can be carried out by, for example, an image sharing module 116 of FIG. 1, or an image management module 112. Process 700 is an example process for merging tags; additional discussions of merging tags are included herein with reference to different figures.

In process 700, an image tagged by a first user as including a particular person is obtained (act 702). This image is obtained, for example, as a result of the first user publishing the image. This tag can be a global tag or a region-specific tag.

A label of the particular person that is used by a second user is determined (act 704). This label can be determined in a variety of different patterns. In one or more embodiments, the tag includes an ID and/or email address (or hash thereof) of the particular person. A record of IDs and/or email addresses is accessed, such as address book 118 of FIG. 1. This record of IDs and/or email addresses includes entries for different people having the name or other label used by the second user to refer to the people. As a separate record is maintained for each user, the names and/or labels associated with particular IDs and/or e-mail addresses can vary.

Additionally, as discussed herein, in one or more embodiments the tag includes a hash value of an email address for the particular person rather than the actual email address for the particular person. In such embodiments, hash values for one or more entries in the record of email addresses are compared to the hash value of the email address in the tag to determine whether the value in the tag is the same as a value in the record of email addresses.

The image is displayed for the second user with the label of that particular person that is used by the second user (act 706). This label is the label identified in act 704.

This merging can also include renaming people. For example, if a user were to change the name of a particular person and record that change in address book 118, any subsequent displays of the label for that particular person based on a tag of an image would include this new name.

As discussed above, a tag can include a name or label, an ID, and/or an email address (or hash thereof). In one or more embodiments, the merging process uses the ID and/or email address (or hash) to determine the label or name used by the second user. For example, if a tag includes both an ID and an email address hash value, then if both the ID and the email address hash value match (are the same as) an entry in the user's address book record, then the label from that entry is displayed as the label or name of the person identified in that tag. If the tag includes only one of the ID and/or email address hash value, then if that one of the ID and/or email address hash value matches (is the same as), then the label from that entry is displayed as the label or name of the person identified in that tag. If the tag includes both an ID and an email address hash value, and if only one of the ID and the email address hash value match (is the same as) an entry in the user's address book record, then in one or more embodiments the label from that entry is displayed as the label or name of the person identified in that tag. In alternate embodiments, the label from that entry is not displayed as the label or name of the person identified in that tag; rather, the name or label in the tag is displayed. In other situations where the ID and/or email address hash value is not included in the tag or does not match (is not the same as) an entry in the user's address book record, the name or label from the tag is displayed.

Table I illustrates an example of possible situations for merging or linking tags. A record of IDs and/or email addresses is accessed, such as address book 118 of FIG. 1, and the entries in this record are compared to the tag. This comparison includes evaluating various criteria to determine whether the tag refers to the same person as an entry in a record, and thus if the tag and the entry can be merged or linked. Table I indicates three criteria that can be evaluated as part of the comparison: the name, the email address (or email address hash value), and the ID. The names in the tag and the record entry can either match or not match. The email addresses (or email address hash values) in the tag and the record entry can either match or not match, or alternatively an email address (or email address hash value) can be absent from one or both of the tag and the record entry. The IDs in the tag and the record entry can either match or not match, or alternatively an ID can be absent from one or both of the tag and the record entry.

Table I also shows, based on these various criteria, whether the tag and the entry can be merged or linked, or whether the tag and the entry cannot be merged or linked. Additionally, examples of how the different matching, not matching, and/or absent conditions might arise are also included in Table I. It is to be appreciated that Table I is only an example, and that alternatively other criteria can be used in determining whether a tag and a record entry can or cannot be merged or linked.

TABLE I

| Name | Email Address (or hash) | ID | Action | Example |
|---|---|---|---|---|
| match | match | match | link | same person |
| match | match | no match | no link | same person shares common email address between two different online service identities |
| match | match | absent | link | same person |
| match | no match | match | no link | person is known by different email addresses to different people |
| match | no match | no match | no link | same person maintains different online service identities |
| match | no match | absent | no link | person has email address separate from online service |
| match | absent | match | link | same person |
| match | absent | no match | no link | the same person, or two different people with the same name |
| match | absent | absent | no link | the same person, or two different people with the same name |
| no match | match | match | link | same person known by different names |
| no match | match | no match | no link | different people sharing an email address |
| no match | match | absent | link | same person |
| no match | no match | match | no link | same person known by different email addresses to different people |
| no match | no match | no match | no link | different people |
| no match | no match | absent | no link | different people |
| no match | absent | match | link | same person known by different name to different people |
| no match | absent | no match | no link | different people |
| no match | absent | absent | no link | different people |

Returning to FIG. 1, it should be noted that situations can arise where an image is altered after the image has been tagged. This alteration can take a variety of different forms, such as altering dimensions of the image, altering the content of the image (e.g., cropping the image), and so forth. In accordance with one or more embodiments, tagging module 114 identifies these alterations and adjusts the tags for that image appropriately so that the tags continue to be associated with the proper portions of the image.

Figure 8:
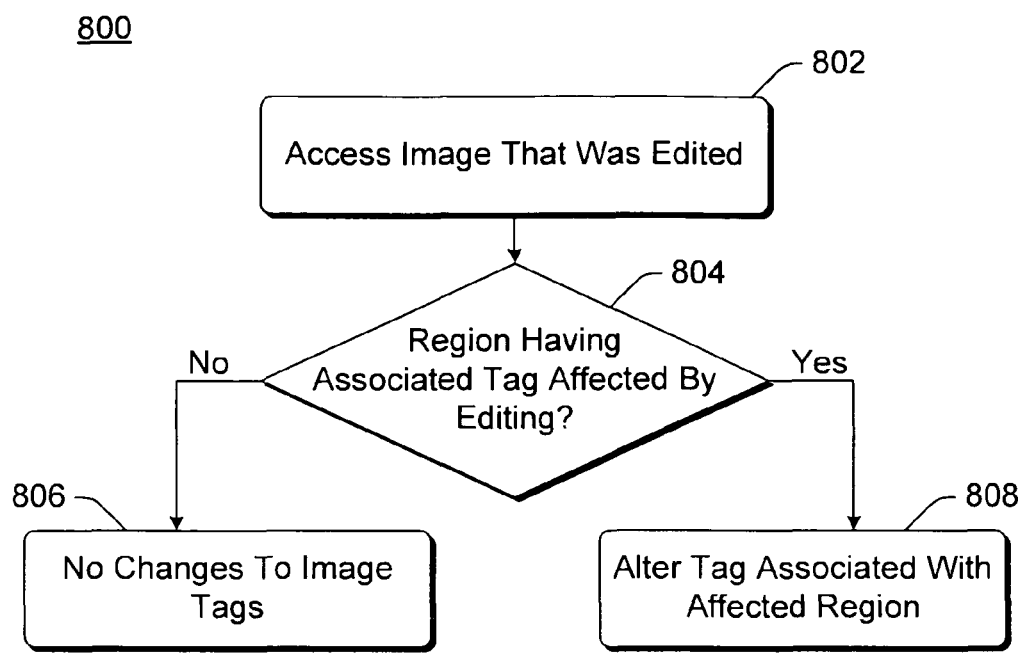
FIG. 8 is a flowchart illustrating an example process for preserving image tags after image edits in accordance with one or more embodiments.

FIG. 8 is a flowchart illustrating an example process 800 for preserving image tags after image edits in accordance with one or more embodiments. Process 800 is carried out by a device, such as a computing device 102 of FIG. 1, and can be implemented in software, firmware, hardware, or combinations thereof. Process 800 can be carried out by, for example, a tagging module 114 of FIG. 1. Process 800 is an example process for preserving image tags after image edits; additional discussions of preserving image tags after image edits are included herein with reference to different figures.

In process 800, an image that was edited is accessed (act 802). A check is made as to whether a region having an associated tag was affected by the editing (act 804). The determination of whether a region having an associated tag was affected by the editing can be made in a variety of different manners. In one or more embodiments, a module or component performing the editing on the image notifies the module implementing process 800 of the specific change or changes made to the image. In such situations, this notification can be used to determine which region or regions, if any, were affected by the editing.

In other embodiments, as part of act 804, the image is analyzed to determine what change or changes were made to the image. Examples of such changes that can be identified include for example a change in the dimension of the image, a change in the aspect ratio of the image, a change in the data of the image, and so forth. Changes to the dimension or aspect ratio of the image can be identified by comparing the dimensions of the image prior to editing to the dimensions of the image after the editing. Changes to the data of the image can be identified in different manners, such as by generating a "fingerprint" of the image. Such a fingerprint can be generated in a variety of different manners. For example, a histogram for the image can be generated as a fingerprint, hash values of different portions of the image (e.g., for each 64-pixel square portions of the image or other sized portions) can be generated as a fingerprint, and so forth. This fingerprint prior to editing can be compared to the fingerprint after the editing in order to determine whether the figure print changed and thus whether the image data changed.

If no region of the image has an associated tag affected by the editing, then no changes are made to the image tags (at 806). However, if a region of the image having an associate tag is affected by the editing, and the tag associated with the affected region is altered as appropriate (act 808). The manner in which the tag associated with the affected region is altered is based at least in part on the type of editing that was done. For example, if the dimensions or aspect ratio of an image were changed, then a description of the region corresponding to the tag may be modified in act 808. By way of another example, if the image data were to be edited such that a portion of the image that includes the region is cropped out of the image, then the tag associated with that region would be deleted.

Table II illustrates an example of the resulting interpretation from editing an image. Based on Table II, the characteristics of the image that are checked (e.g., as part of act 804) include: the dimensions of the image, the aspect ratio of the image, a modification date of the image (the date and/or time when the image was most recently modified), and a fingerprint of the image. An example interpretation of these changes is also included in Table II. It is to be appreciated that Table II is only an example, and that alternatively other interpretations of editing of an image can be used.

TABLE II

| Dimensions Changed? | Aspect Ratio Changed? | Date Modified Changed? | Fingerprint Changed? | Interpretation |
| --- | --- | --- | --- | --- |
| No | No | No | No | No changes were made to the image. |
| No | No | Yes | No | Metadata for the image was changed but image data was not changed. |
| No | No | Yes | Yes | Image data was edited. |
| Yes | No | Yes | Yes | Image was resized; image data may or may not have been edited. |
| Yes | Yes | Yes | Yes | Image was cropped |

Changes to the tags associated with the image can then be made based on the interpretation from Table II. For example, if the image was cropped then a check can be made as to whether the region associated with the tag was cropped out of the image, and the tag deleted if the associated region was cropped out of the image. By way of another example, if the image was resized then the definitions of regions in the image can be updated in accordance with this resizing. By way of yet another example, if the image data was edited, then a check can be made as to whether regions associated with the image still include faces, and regions that no longer include faces can be deleted (e.g., tags associated with the regions can be deleted, the region-specific tags can be converted to global tags, etc.).

Additionally, the image tags can be used in other manners to provide additional features to users. One such additional use is to create a credits list for a compilation of images. A compilation of images refers to a collection of two or more images grouped together for display. For example, a compilation of images could be a slide show, video (which can be referred to as a sequence of images), a movie that includes video as well as the images, and so forth. Such image compilations can be generated in a variety of different conventional manners.

Figure 9:
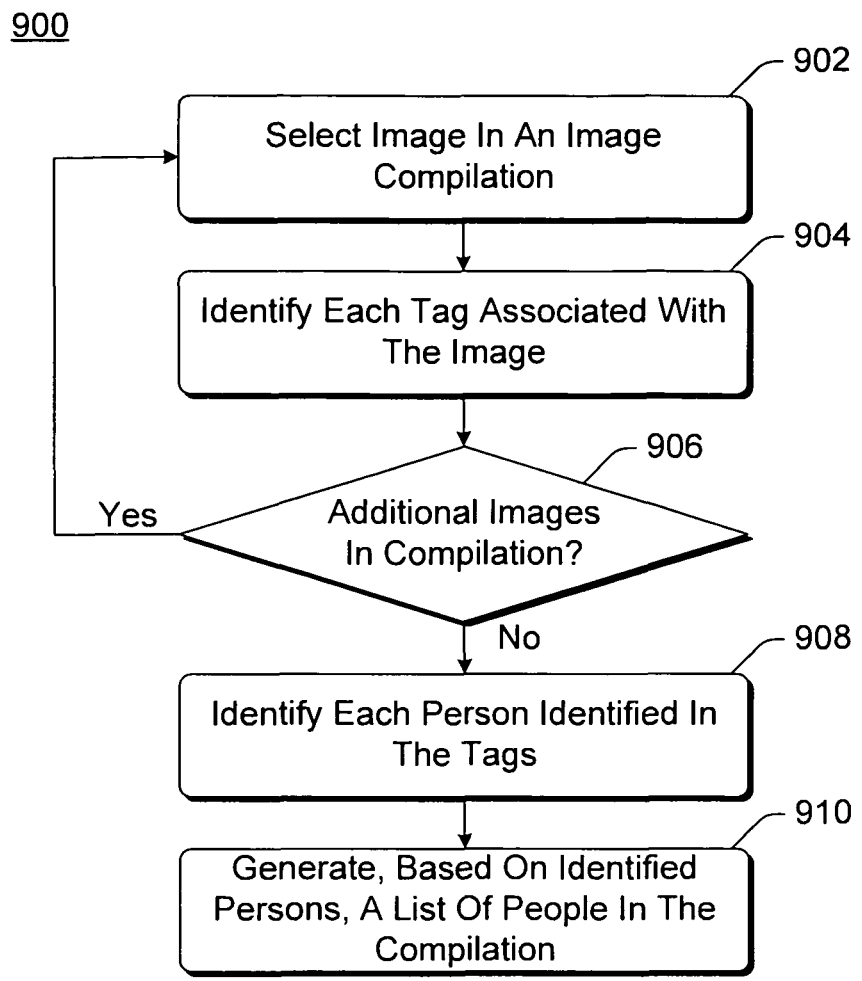
FIG. 9 is a flowchart illustrating an example process for generating a credits list in accordance with one or more embodiments.

FIG. 9 is a flowchart illustrating an example process 900 for generating a credits list in accordance with one or more embodiments. Process 900 is carried out by a device, such as a computing device 102 or server 104 of FIG. 1, and can be implemented in software, firmware, hardware, or combinations thereof. Process 900 is an example process for generating a credits list; additional discussions of generating a credits list are included herein with reference to different figures.

In process 900, an image from the image compilation is selected (act 902). The image can be selected in a variety of different manners, such as in order of appearance in the image compilation, randomly, and so forth. Each tag associated with the selected image is identified (act 904). A check is then made as to whether there are additional images in the compilation that have not been selected yet (act 906). If there are images that have not been selected yet than process 900 returns to act 902 to select one of those images.

However, if all the images in the compilation have been selected, then process 900 proceeds to identify each person identified in the tags (act 908). The tags in act 908 are those that were identified in act 904.

A list is generated of the people appearing in the compilation based on the identified persons (act 910). In one or more embodiments, the list generated in act 910 identifies each person that is identified in one or more tags of one or more images in the image compilation. Each person is typically included in the list only once regardless of the number of times they occur in tags, although alternatively individuals may be listed multiple times. The list of people can be organized in a variety of different manners, such as corresponding to the order of appearance of the people in the image compilation, in accordance with a frequency with which people are identified in the images, alphabetically, randomly, and so forth.

The list can then be displayed as, for example, a credits list after the image compilation is displayed. Alternatively, the list can be displayed at other times, such as before the image compilation is displayed, in response to a user request for the list, and so forth.

As discussed above, in one or more embodiments the image compilation can be a video having tags. The tags can be associated with the video and/or individual images of the video. In situations where one or more tags are associated with the video rather than an individual image, the tags identified in act 904 include the one or more tags associated with the video.

Figure 10:
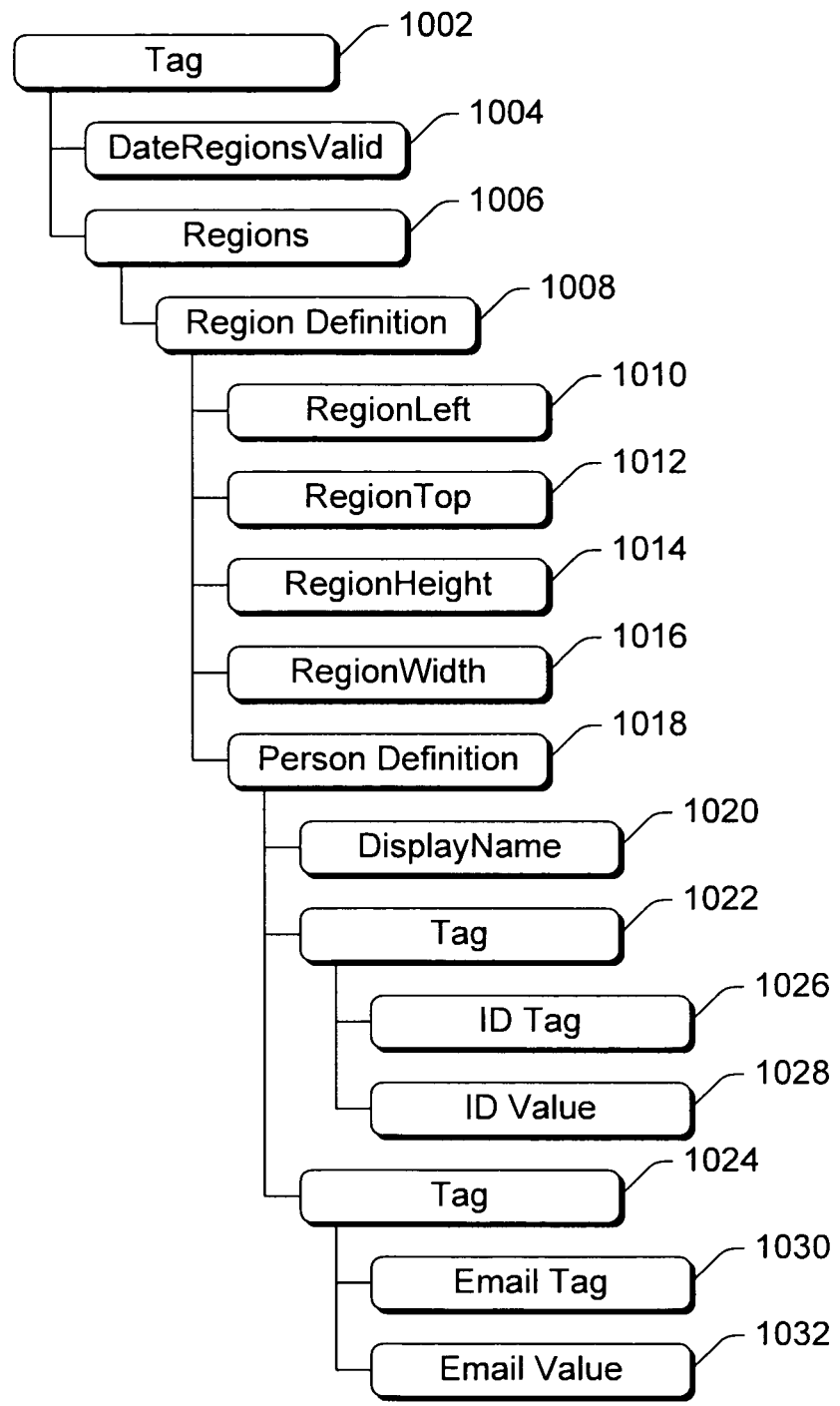
FIG. 10 illustrates an example schema for storing tags in accordance with one or more embodiments.

FIG. 10 illustrates an example schema 1000 for storing tags in accordance with one or more embodiments. The schema 1000 stores the tag data along with the image data, allowing the tag data to be easily transferred when the image is transferred. In one or more embodiments, schema 1000 is used to store the tag data as metadata for the image. It is to be appreciated that schema 1000 illustrates an example manner of storing tags in a data structure along with the image data, and that alternatively tags can be stored in other manners.

Schema 1000 includes a Tag portion 1002 that identifies the remaining portions as being tag data. Tag portion 1002 includes a DateRegionsValid portion 1004 that stores data identifying when the specific regions were tagged (e.g., the tag data was associated with the specific regions). Tag portion 1002 also includes one or more Region portions 1006. Only one Region portion 1006 is shown in FIG. 10, although alternatively multiple Region portions 1006 can be included in Tag portion 1002.

Region portion 1006 includes a Region Definition portion 1008 that defines a region for the image. The region is defined by a RegionLeft portion 1010 that stores data identifying a left side of a rectangle of the region, a RegionTop portion 1012 that stores data identifying a top of the rectangle of the region, a RegionHeight portion 1014 that stores data identifying the height of the rectangle of the region, and a RegionWidth portion 1016 that stores data identifying the width of the rectangle of the region. In one or more embodiments, the data stored in portions 1010-1016 is normalized to a value between 0 and 1. Thus, rather than storing data identifying a fixed location for the region, these portions store data identifying a relative location for the region. Accordingly, if the image dimensions and/or aspect ratio are changed, these values defining the region need not be updated.

Region Definition portion 1008 also includes a Person Definition portion 1018. Person Definition portion 1018 identifies the person included in the region, and includes a DisplayName portion 1020, a Tag portion 1022, and a Tag portion 1024. DisplayName portion 1020 identifies the name that the user generating the tag calls the person (e.g., "Mom", "Sis", etc.). Tag portion 1022 includes an ID Tag portion 1026 identifying Tag portion 1022 as including data representing an ID of the person, and ID Value portion 1028 includes the ID value. Tag portion 1024 includes an Email Tag portion 1030 identifying Tag portion 1024 as including data representing an email address of the person, and Email Value portion 1032 includes a hash of the email address.

As discussed above, a hash of the person's email address is included in Email Value portion 1032 rather than the actual email address. This provides a level of privacy for the user, protecting the user from having his or her email address being published to other users. A variety of different one-way hash algorithms can be used to generate the has value of the email address stored in portion 1032. A one-way hash algorithm refers to a hash algorithm generating a hash value in which it is computationally infeasible (if not impossible) to recreate the email address given the hash value alone. Alternatively, protection techniques other than hash algorithms can be employed to protect the email address, such as having the email address encrypted.

In one or more embodiments, schema 1000 is used for global tags as well as region-specific tags. For a global tag, the data identifying the specific region (e.g., in portions 1010-1016) are set to zero (or alternatively some other known value). If the global tag is later changed to a region-specific tag, these portions 1010-1016 can be populated with the data identifying the particular region for the tag.

Figure 11:
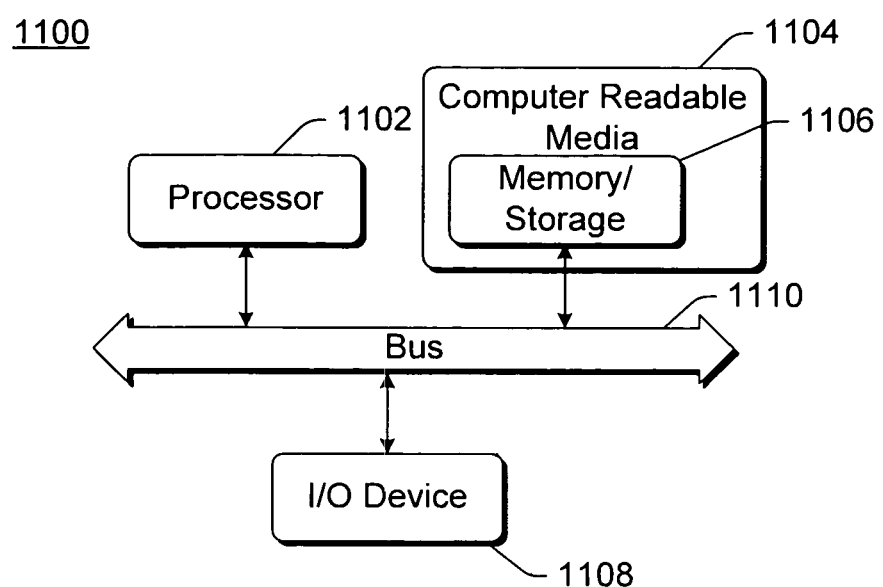
FIG. 11 illustrates an example computing device that can be configured to implement the image tagging user interface in accordance with one or more embodiments.

FIG. 11 illustrates an example computing device 1100 that can be configured to implement the image tagging user interface in accordance with one or more embodiments. Computing device 1100 can be, for example, a computing device 102 or server 104 of FIG. 1.

Computing device 1100 includes one or more processors or processing units 1102, one or more computer readable media 1104 which can include one or more memory and/or storage components 1106, one or more input/output (I/O) devices 1108, and a bus 1110 that allows the various components and devices to communicate with one another. Computer readable media 1104 and/or one or more I/O devices 1108 can be included as part of, or alternatively may be coupled to, computing device 1100. Bus 1110 represents one or more of several types of bus structures, including a memory bus or memory controller, a peripheral bus, an accelerated graphics port, a processor or local bus, and so forth using a variety of different bus architectures. Bus 1110 can include wired and/or wireless buses.

Memory/storage component 1106 represents one or more computer storage media. Component 1106 can include volatile media (such as random access memory (RAM)) and/or nonvolatile media (such as read only memory (ROM), Flash memory, optical disks, magnetic disks, and so forth). Component 1106 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1102. It is to be appreciated that different instructions can be stored in different components of computing device 1100, such as in a processing unit 1102, in various cache memories of a processing unit 1102, in other cache memories of device 1100 (not shown), on other computer readable media, and so forth. Additionally, it is to be appreciated that the location where instructions are stored in computing device 1100 can change over time.

One or more input/output devices 1108 allow a user to enter commands and information to computing device 1100, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The term "module" as used herein generally represents software, firmware, hardware, or combinations thereof. In the case of a software implementation, the module represents program code that performs specified tasks when executed on a processor (e.g., CPU or CPUs). The program code can be stored in one or more computer readable media, further description of which may be found with reference to FIG. 11. The features of the image tagging user interface techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage memory having stored thereon multiple instructions that, when executed by one or more processors, cause the one or more processors to:
    receive a global tag for an image, the global tag identifying one or more objects in the image;
    receive a region-specific tag for the image, the region-specific tag identifying one or more objects in a region of the image and having an association with the region of the image, the region-specific tag including a first label of a person in the region that is used by a first user to identify the person in the region;
    store the global tag and the region-specific tag with the image;
    determine a second label of the person in the region that is used by a second user to identify the person in the region;
    display, along with the image, an identifier for each of the one or more objects identified in the global tag, and an identifier for each of the one or more objects identified in the region-specific tag;
    display, when displaying the image for the first user, the first label for the person in the region;
    display, when displaying the image for the second user, the second label for the person in the region; and
    enable conversion of the global tag to an additional region-specific tag, and enable conversion of the region-specific tag to an additional global tag that is associated with the image as a whole, the conversion of the region-specific tag to the additional global tab comprising removal of the association with the region of the image from the region-specific tag to cause the region-specific tag to become the additional global tag that is associated with the image as a whole.

2. One or more computer storage memory as recited in claim 1, the multiple instructions further causing the one or more processors to:
    automatically identify one or more regions of the image based on detecting faces within the image;
    display a list of people; and
    wherein to receive the region-specific tag is to receive a user selection of one of the one or more regions and a person from the list of people.

3. One or more computer storage memory as recited in claim 1, the multiple instructions further causing the one or more processors to:
    display a list of people; and
    wherein to receive the region-specific tag is to receive a user selection of a person from the list of people that is included in the region.

4. One or more computer storage memory as recited in claim 3, wherein to display the list is to display the list so that people that are more frequently selected as being included in images are displayed before people that are less frequently selected as being included in the images.

5. One or more computer storage memory as recited in claim 3, wherein to display the list is to display the list so that people that have been identified more recently as being included in images are displayed before people that are identified less recently as being included in the images.

6. One or more computer storage memory as recited in claim 1, the multiple instructions further causing the one or more processors to display an option that can be selected by a user to identify the user as being included in the region.

7. One or more computer storage memory as recited in claim 1, the multiple instructions further causing the one or more processors to:
    receive multiple additional region-specific tags for the image, each of the multiple additional region-specific tags identifying one or more objects in different regions of the image; and
    store the multiple additional region-specific tags with the image.

8. One or more computer storage memory as recited in claim 1, the multiple instructions further causing the one or more processors to:
    identify, for each of multiple images included in an image compilation, one or more tags associated with each image;
    identify, for each identified tag, a person identified in the tag; and
    generate a list of people in the image compilation, the list including each identified person.

9. A method comprising:
    receiving a region-specific tag for an image, the region-specific tag identifying one or more objects in a region of the image and having an association with the region of the image, the association including data that defines the region of the image;
    storing the region-specific tag with the image;
    displaying, along with the image, an identifier for the object identified in the region-specific tag;
    displaying a label selected from a plurality of labels for the object in the image that are useable by different users to identify the object in the image when the image is displayed for respective ones of the different users, the label selected from the plurality of labels based on which of the different users is using the image; and
    converting the region-specific tag to a global tag responsive to a user selection of a make-global control by at least removing the association with the region of the image from the region-specific tag to cause the region-specific tag to become the global tag and be associated with the image as a whole.

10. The method as recited in claim 9, wherein the region in the image is automatically identified based on detecting a face within the image.

11. The method as recited in claim 9, further comprising displaying an option that can be selected by a user to identify the user as being included in the region.

12. The method as recited in claim 9, further comprising converting an additional global tag for the image to an additional region-specific tag for the image.

13. The method as recited in claim 9, further comprising:
receiving multiple additional region-specific tags for the image, each of the multiple additional region-specific tags identifying one or more objects in different regions of the image; and
storing the multiple additional region-specific tags with the image.

14. A method comprising:
receiving, at a computing device and from a remote device, a global tag associated with an image shared by the remote device, the global tag identifying an object in the image and having an association with the image as a whole;
storing the global tag with the image;
displaying, along with the image, an identifier for the object identified in the global tag;
receiving a user selection of a region in the image and a user selection of the identifier for the object that is in the image and which is identified in the global tag; and
converting the global tag to a region-specific tag for the image by adding data that identifies the region to the global tag to cause the global tag to become the region-specific tag, the region-specific tag identifying the object in the region of the image and having an association with the selected region of the image based on the added data; and
displaying one of a plurality of different labels for the object in the image based on the image being displayed for a particular user, a first said label being displayed to identify the object when the image is displayed for a first user, a second said label being displayed to identify the object when the image is displayed for a second user.

15. The method as recited in claim 14, wherein the region in the image is automatically identified based on detecting a face within the image.

16. The method as recited in claim 14, further comprising displaying an option that can be selected by a user to identify the user as being included in the region.

17. The method as recited in claim 14, further comprising:
receiving an additional region-specific tag for the image shared by the remote device, the additional region-specific tag being defined by the user of the remote device; and
converting the additional region-specific tag for the image to an additional global tag for the image.

18. The method as recited in claim 14, further comprising:
receiving multiple additional region-specific tags for the image, each of the multiple additional region-specific tags identifying one or more objects in different regions of the image; and
storing the multiple additional region-specific tags with the image.

19. The method as recited in claim 14, wherein the object includes a person in the region, the first said label being useable by the first user to identify the person in the region, and further comprising:
determining the second said label that is useable by a second user to identify the person in the region when displaying the image for the second user; and
displaying the image with the second said label when displaying the image for the second user.

20. The method as recited in claim 14, wherein the plurality of different labels are each associated with a different user that created the label.

* * * * *